(12) United States Patent
Fast

(10) Patent No.: US 10,015,957 B1
(45) Date of Patent: *Jul. 10, 2018

(54) LEVELING HUNTING STAND SYSTEM

(71) Applicant: Curtis D. Fast, Mountain Lake, MN (US)

(72) Inventor: Curtis D. Fast, Mountain Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,707

(22) Filed: Jul. 28, 2015

Related U.S. Application Data

(63) Continuation of application No. 13/082,377, filed on Apr. 7, 2011, now Pat. No. 9,089,125.

(60) Provisional application No. 61/342,028, filed on Apr. 7, 2010.

(51) Int. Cl.
*F16M 13/02* (2006.01)
*A01M 31/02* (2006.01)
*E04G 3/24* (2006.01)

(52) U.S. Cl.
CPC .............. *A01M 31/02* (2013.01); *E04G 3/24* (2013.01)

(58) Field of Classification Search
CPC ..................................................... A01M 31/02
USPC ..... 182/187, 188; 248/308, 290.1, 339, 341, 248/303, 129
See application file for complete search history.

(56) References Cited

U.S. PATENT DOCUMENTS

| | | | | | |
|---|---|---|---|---|---|
| 449,103 | A | * | 3/1891 | Bachem | A44C 13/00 63/10 |
| 477,270 | A | * | 6/1892 | Roos | A47G 25/0685 223/1 |
| 3,358,789 | A | * | 12/1967 | Laun | A01M 31/02 108/152 |
| 3,861,633 | A | * | 1/1975 | Rappleye | B62B 3/146 248/290.1 |
| 4,411,335 | A | * | 10/1983 | Forrester | A01M 31/02 182/180.1 |
| 4,936,416 | A | * | 6/1990 | Garon | A45F 3/26 108/152 |
| 5,009,283 | A | * | 4/1991 | Prejean | A01M 31/02 182/116 |
| 5,143,177 | A | * | 9/1992 | Smith | A01M 31/02 182/136 |
| 5,199,527 | A | * | 4/1993 | Jennings | A45F 3/26 182/187 |

(Continued)

*Primary Examiner* — Daniel P Cahn
(74) *Attorney, Agent, or Firm* — Albert W. Watkins

(57) ABSTRACT

A leveling hunting stand system for providing a substantially level platform and seat at an elevated position with respect to a ground surface regardless of the orientation of an upstanding support structure on which the stand is mounted. A base assembly mounts to the upstanding support structure, and a platform and seat assembly are pivotally suspended from the base assembly. The base assembly includes a generally vertical support member and a lateral member. A T-hook or strap-on hook member mounts the upper base assembly to the upstanding support structure, and a ratchet further secures the base assembly to the upstanding support structure. The platform is pivotally mounted to the lateral member, and a platform leveler supports a suspension assembly linking the platform to the leveler such that quick release devices position the extent of the leveling of the platform member with respect to the ground.

19 Claims, 11 Drawing Sheets

(56) References Cited

U.S. PATENT DOCUMENTS

| | | | | |
|---|---|---|---|---|
| 5,285,868 A * | | 2/1994 | Amacker | A01M 31/02 182/134 |
| 5,394,957 A * | | 3/1995 | Doby | A01M 31/02 108/152 |
| 5,439,074 A * | | 8/1995 | Trout | A01M 31/02 108/152 |
| 5,515,943 A * | | 5/1996 | Antonelli | A01M 31/02 108/152 |
| 5,562,180 A * | | 10/1996 | Herzog | A01M 31/02 108/152 |
| 6,085,868 A * | | 7/2000 | Anthony | A01M 31/02 108/152 |
| 6,199,660 B1 * | | 3/2001 | Meeks | A01M 31/02 182/116 |
| 6,367,585 B1 * | | 4/2002 | Fast | A01M 31/02 182/135 |
| 6,386,321 B1 * | | 5/2002 | Muhich | A01M 31/02 182/135 |
| 6,516,919 B1 * | | 2/2003 | Sempel | A01M 31/02 182/187 |
| 6,571,916 B1 * | | 6/2003 | Swanson | A01M 31/02 108/152 |
| 6,684,812 B1 * | | 2/2004 | Tucker | A01K 5/02 119/51.01 |
| 6,883,644 B1 * | | 4/2005 | Braun | A01M 31/02 108/152 |
| 7,014,594 B2 * | | 3/2006 | Stoltz | A62B 1/14 182/133 |
| 7,021,423 B1 * | | 4/2006 | Pestrue | A01M 31/02 182/116 |
| 7,174,995 B1 * | | 2/2007 | Alexander | A01M 31/02 182/187 |
| RE39,725 E * | | 7/2007 | Muhich | 182/135 |
| 7,296,658 B1 * | | 11/2007 | Pederson | A01M 31/02 182/133 |
| 7,377,361 B1 * | | 5/2008 | Tschida | A01M 31/02 182/187 |
| 7,458,563 B1 * | | 12/2008 | Liu | A01M 31/02 254/334 |
| 8,177,177 B2 * | | 5/2012 | Ehrig | A01M 31/02 182/187 |
| 8,708,104 B1 * | | 4/2014 | Sponsler | A01M 31/02 182/133 |
| 8,794,384 B1 * | | 8/2014 | Holford | A01M 31/02 182/187 |
| 8,833,521 B1 * | | 9/2014 | Jude | A01M 31/02 182/12 |
| 9,516,874 B2 * | | 12/2016 | Richey | A01M 31/02 |
| 2002/0112919 A1 * | | 8/2002 | Graham, Jr. | A01M 31/02 182/116 |
| 2003/0178251 A1 * | | 9/2003 | Hewitt | A01M 31/02 182/63.1 |
| 2003/0192741 A1 * | | 10/2003 | Berkbuegler | A01M 31/02 182/187 |
| 2004/0140157 A1 * | | 7/2004 | Undi | A01M 31/025 182/187 |
| 2004/0140158 A1 * | | 7/2004 | Wilcox | A41D 13/0007 182/187 |
| 2005/0039985 A1 * | | 2/2005 | Butterworth | A01M 31/02 182/187 |
| 2005/0043150 A1 * | | 2/2005 | Nitta | A63B 21/026 482/79 |
| 2005/0167200 A1 * | | 8/2005 | McFall | A01M 31/02 182/187 |
| 2006/0197001 A1 * | | 9/2006 | Parker | F16M 11/10 248/230.8 |
| 2006/0207831 A1 * | | 9/2006 | Moore | A01M 31/006 182/20 |
| 2007/0114096 A1 * | | 5/2007 | Skipper | A01M 31/02 182/116 |
| 2007/0256892 A1 * | | 11/2007 | Breedlove, Sr. | A01M 31/02 182/116 |
| 2007/0261919 A1 * | | 11/2007 | Roe | A01M 31/02 182/187 |
| 2008/0169155 A1 * | | 7/2008 | Broberg | A01M 31/02 182/187 |
| 2008/0236948 A1 * | | 10/2008 | duCellier | A01M 31/02 182/187 |
| 2009/0064743 A1 * | | 3/2009 | Gee | A01M 31/02 70/263 |
| 2009/0078500 A1 * | | 3/2009 | Wydner | A01M 31/02 182/3 |
| 2010/0078541 A1 * | | 4/2010 | Fathi | A44B 15/005 248/339 |
| 2011/0308887 A1 * | | 12/2011 | Johnson | A01M 31/02 182/187 |
| 2012/0067667 A1 * | | 3/2012 | Marcoux | A62B 35/0068 182/3 |
| 2012/0080267 A1 * | | 4/2012 | Furseth | A01M 31/02 182/115 |

\* cited by examiner

LEVELING HUNTING STAND SYSTEM

CROSS REFERENCE TO RELATED APPLICATIONS

The present application is a continuation of U.S. patent application Ser. No. 13/082,377 filed Apr. 7, 2011 and granting on Jul. 28, 2015 as U.S. Pat. No. 9,089,125, which in turn claims the benefit under 35 USC 119(e) of U.S. provisional application Ser. No. 61/342,028, filed Apr. 7, 2010 and therewith, and naming the present inventor, the contents which are incorporated herein by reference in entirety.

BACKGROUND OF THE INVENTION

1. Field of the Invention

The present invention pertains generally to scaffolding supported upon and external to a shaft, and more particularly pertains to a leveling hunting stand system for providing a substantially level platform and seat regardless of the orientation and geometry of the structure upon which the stand is mounted.

2. Description of the Related Art

Man has hunted various animals since prehistoric times, and his very existence undoubtedly depended upon his success or failure. With modern ranching and farming, hunting is no longer necessary for the survival of mankind Instead, modern wildlife management most preferably ensures populations of various species are controlled at levels that are healthy and sustainable. As a result, hunting has evolved into a sport that allows individuals to challenge themselves in a way that can be very enjoyable, while still providing beneficial food and wildlife species population management.

In order for the sport to be more enjoyable, and simultaneously safer for the hunter, varous factors must be considered by each hunter. One of these is how the hunter will encounter the game animals. One technique is to move about at ground level, with the intent to surprise or flush out the game. Unfortunately, large game animals have extremely keen senses, and this technique more frequently will lead to the animals fleeing from and staying beyond the range of the hunter. Furthermore, this movement along the ground can be extremely dangerous for the hunter. Traveling along the ground greatly increases the risk of accidental gun discharges, and since there may be other hunters about, there is an increased risk of the hunter on the ground being mistaken for game by another hunter.

Many hunters over the years have come to gain advantage over game animals by taking advantage of a weakness that most of these animals have. Most large game animals do not detect hunters when the hunters remain relatively still and elevated above the ground. Consequently, the hunter may position himself in a tree or upon another support that raises above the ground, where he can wait. Particularly when the hunter is near a well-used trail, the game animals will traverse the ground and come near to the elevated hunter, rather than the hunter moving to the game. This allows the hunter to slowly and gently elevate his gun without the game detecting the movement.

Unfortunately, there is no way for the hunter to know how quickly the game animals will come near. Consequently, the hunter may commonly spend large amounts of time in the tree waiting. To best endure these long waiting periods, and retain the enjoyment and safety of the sport, the hunter will most desirably be as comfortable as reasonably possible. Rather than simply climb the tree and sit in the branches, which can be quite uncomfortable, dangerous and limiting with regard to optimum positioning, artisans have long designed various stands to support the hunter.

These stands range from very basic seats that are mounted to poles or trees to large, partially or fully enclosed shelters. Where an individual owns the land or can otherwise construct permanent structures, and where the individual is also familiar with the movement of the game, it is commonplace for a hunter to construct a relatively large and semi-permanent structure. However, a large structure is extremely difficult to move between locations, assemble and elevate, and so is of little or no value for hunters who are not able to leave the stand up in between hunting excursions, or for hunters who are less familiar with the patterns of the game on the land being hunted. As is well known, a trail that may be frequently traversed by game during one part of the year may be abandoned during another part of the year. Consequently, a small and lightweight stand is very much preferred or required by many hunters. In contrast to the large shelters, a number of artisans have designed small, lightweight and portable seats that may be used for hunting. Exemplary of these are U.S. Pat. No. 3,115,213 by Cloutier, entitled "Portable seat"; U.S. Pat. No. 3,944,279 by Blackstock et al, entitled "Hunter's seat"; U.S. Pat. No. 4,582,168 by Frey, entitled "Hunter's tree seat"; and U.S. Pat. No. 6,328,131 by Backus, entitled "Roll-up tree seat"; the contents and teachings of each which are incorporated herein by reference. While these seats offer much flexibility missing in larger shelters, they require placement next to a foot rest, such as a branch, to that the hunter does not remain with feet dangling for extended periods. Unfortunately, this very placement can interfere with the ability of the hunter to sight an animal, since the branch that the hunter is resting his feet on may block the line of sight to the animal. While U.S. Pat. No. 3,396,818 by Moragne, entitled "Animal stand", the teachings and content which are incorporated herein by reference, addresses the foot rest, there is no space for the hunter to store or rest anything, including any food, beverage, or even the weapon being used by the hunter. As a result, these simple seats are undesirably basic and so detract from the sport.

Many conventional hunting stands incorporate both a seat and a platform, and so provide both a foot rest and support for additional gear, accessories, food, beverage and the like. Most are designed for mounting to upstanding members such as trees, poles, and other generally vertically oriented structures. However, few trees grow perfectly "plumb" or vertical, making many trees unsuitable for a conventional hunting stand. These conventional hunting stands, when hung in a non-vertical tree, slant dangerously in both the platform and seat, presenting a serious hazard to the hunter using the stand. Conventional stands mounted on tree surfaces also commonly shift and pivot when a hunter shifts his or her weight, which may lead to a serious fall or accidental gun discharge.

A few artisans have recognized the need for an adjustable tree stand that compensates for a leaning tree. Among these are U.S. Pat. No. 6,571,916 by Swanson, entitled "Fully adjustable hunting tree stand"; U.S. published application 2007/0151803 by D'Acquisto, entitled "Offset tree stand mounting bracket"; and 2006/0196726 by Pestrue, entitled "Leveling device for use with a tree stand, tree stand incorporating same, and method of using same"; the teachings and contents of each which are incorporated herein by reference. In addition to the teachings of these other artisans, the teachings and contents of my U.S. Pat. No. 5,927,437, entitled "Universal hunting stand"; and U.S. Pat. No. 6,367,585, entitled "Adjustable hunting stand system"; which also illustrate adjustable tree stands that compensate for a leaning tree or support, are incorporated herein by reference. Unfortunately, these prior art adjustable stands are limited to tilt or rotation in a single plane, which presents undesirable limitation.

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In contrast to the foregoing disadvantages of conventional hunting stands, many which are designed for plumb trees, the leveling hunting stand system of the present invention provides a mounting system that will let the stand mount on trees with slants or slopes back and sideways or fore and aft, and still provide a level seat and platform. To obtain this capability, a tee structure is mounted to a tree by a screw-in t-hook or j-hook, or a strap-on j-hook or j-and-t-hook receiver that is attached to the tree. The tee is then supported by these hook members, with the receiver or slots on the back side of the tee upstanding member. The lateral member of the tee is the main reason for the versatility of the leveling hunting stand system. It is strapped to the tree in a level position where the tree makes contact with the back of the lateral member of the tee. Strapping the lateral member to the tree may comprise one of several alternative apparatus, including: raised surfaces in a pattern along the lateral member preventing s-hook slipping; slotted patterns along the lateral member preventing s-hook slipping; or holes in the front side of lateral member preventing s-hook slipping. The platform is attached to the tee on the lateral ends, and then brought to a more leveled position by cables attaching the upstanding member of the tee to the platform. The platform is then leveled by adjusting the cables to the upstanding members leveling holes in a fixed plate. Two other alternatives are illustrated for cable adjustments, including cable hooks or metal pin hooks, all providing fine adjustment settings. The seat, mounted to the upstanding member of the tee, is in the preferred embodiment leveled with an adjusting bolt. With the upstanding member secured to the tree this provides a secure and level hunting stand mounted on trees that lean back or sideways and fore and aft, making the level hunting stand system safer and more secure than prior art hunting stands.

In a first manifestation, the invention is a leveling hunting stand system operatively mounted on an upstanding member and operatively providing a support for a person at an elevated position with respect to a ground surface. A mounting couples a base assembly to the upstanding member through at least two axes of rotation. A platform assembly has a platform operatively supporting a person, the platform pivotally mounted to the base assembly. A platform support structure supports the platform in a plurality of positions with respect to the base assembly such that the platform is supportable in a level orientation relatively independent of an orientation of the upstanding member.

In a second manifestation, the invention is an elevated leveling hunting stand system for mounting on an upstanding member and operatively supporting a person at an elevated position with respect to a ground surface. A base assembly having plurality of platform leveling attachment points. A mounting couples the base assembly to the upstanding member. A platform assembly has a platform operatively supporting a person, the platform pivotally mounted to the base assembly. A platform support structure is attached to the base assembly by a flaccid member coupled to at least one of the platform leveling attachment points and supporting the platform in a plurality of positions with respect to the base assembly, such that the platform is supportable in a level orientation relatively independent of an orientation of the upstanding member.

OBJECTS OF THE INVENTION

Exemplary embodiments of the present invention solve inadequacies of the prior art by providing a level hunting stand platform and seat, regardless of the orientation of the support. A first object of the invention is to provide a hunting stand that adds to the comfort, enjoyment and safety of the sport. A second object of the invention is to provide a small and lightweight stand that may easily be transported between different locations. Another object of the present invention is for the stand to be adaptable to very diverse supports, including trees that are not vertical and that have branches and imperfections that must be accommodated. A further object of the invention is to provide a new leveling hunting stand system which may be easily, economically and efficiently manufactured and marketed, that is durable and of reliable construction.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
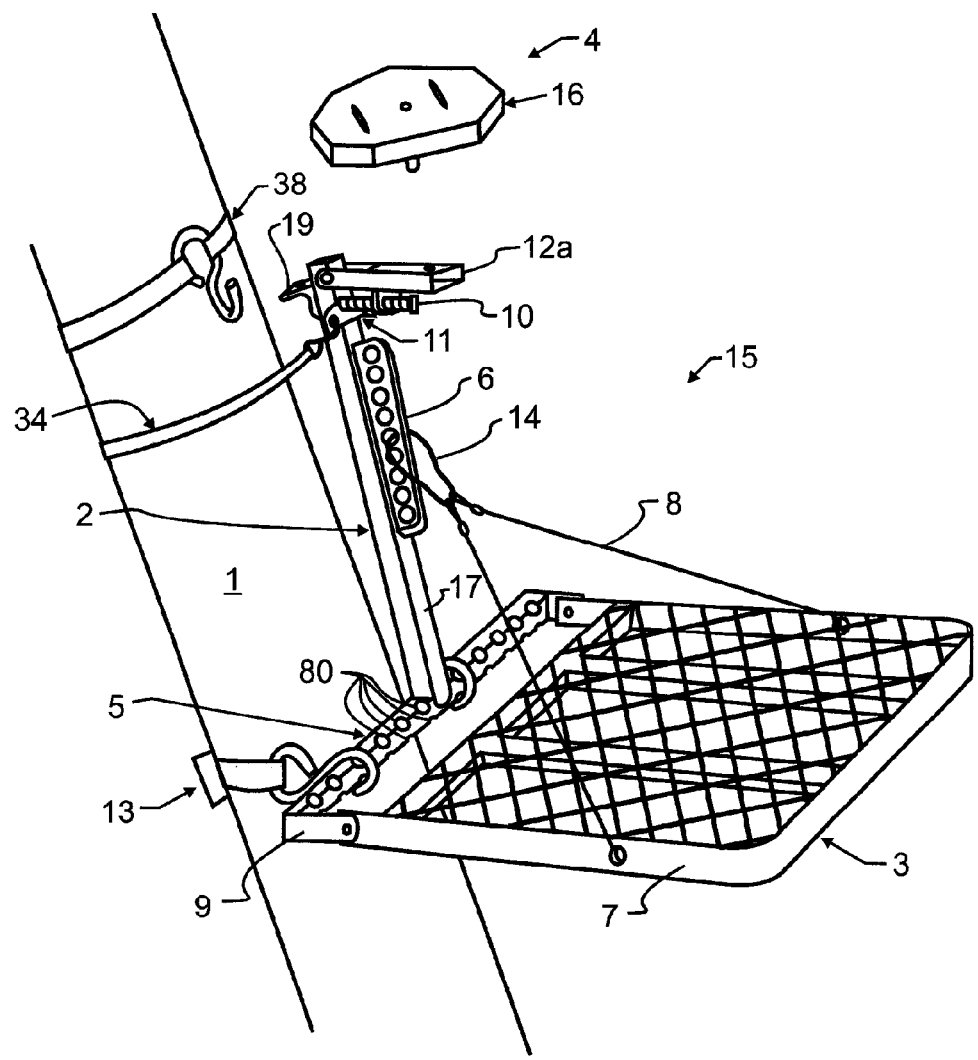
FIG. 1 illustrates a first preferred embodiment leveling hunting stand system designed in accord with the teachings of the present invention from a projected view, with the hunting seat detached and an alternative tree coupling detached, each detached solely for illustrative purposes.

Manifested in the preferred and alternative embodiments, the present invention provides a new leveling hunting stand system 15 embodying the principles and concepts of the present invention. Leveling hunting stand system 15 is highly effective for mounting on an upstanding member 1 such as a tree trunk, tree limb or other suitable structure, and thereby providing support for a person on upstanding member 1 at an elevated position with respect to the earth or a ground surface. Leveling hunting stand system 15 generally comprises a base assembly 2, a platform assembly 3 and a seat assembly 4. Base assembly 2 is mounted to upstanding member 1 with one of several alternative mounting apparatus, such as strap-on hooks 38, 48 or screw-in T-hook 58, each illustrated by enlarged sectional view for exemplary purposes in FIGS. 8a-8c and further described herein below, depending upon the nature of upstanding member 1 and the preferences of the user. Once suitable mounting apparatus are mounted to upstanding member 1, this provides an anchor to attach base assembly 2 on to, taking away the need for a person to hold the tree stand while simultaneously strapping the stand to the tree or limb. As may be appreciated, simultaneously holding the stand while strapping it, as required in the prior art, adds undesirable risk and danger. The back of base assembly 2 in the preferred embodiment has three ways to attach to the hooks 38, 48, 58. Receivers 19 and 29-32 attach to hooks 38 and 58, while receiver 19 in combination with a fastener such as bolt 21 and nut 22 would attach with hook 48.

Figure 8A:
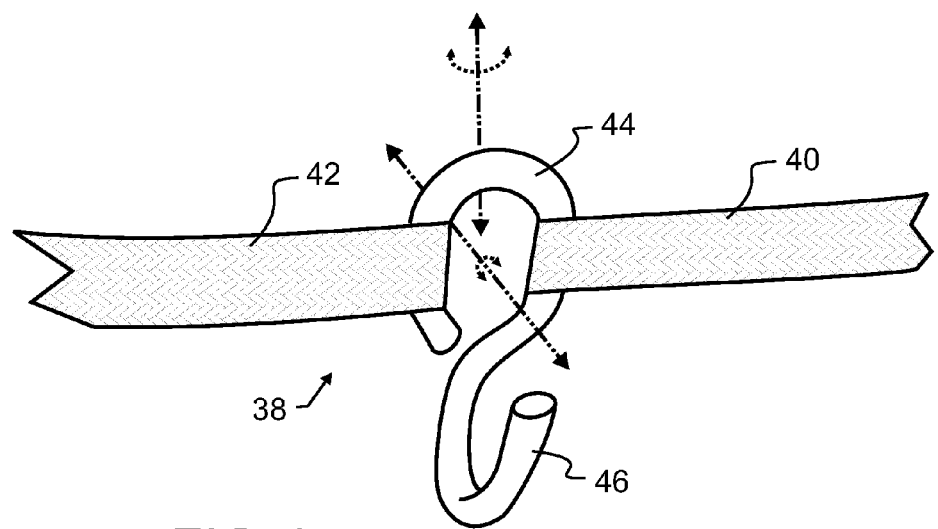
FIGS. 8a-8c illustrate alternative methods of mounting the stand to the tree, with FIG. 8a showing a strap on j-hook as visible in FIG. 1, FIG. 8b showing a strap-on receiver, and FIG. 8c showing a screw-in t-hook.
Figure 8B:
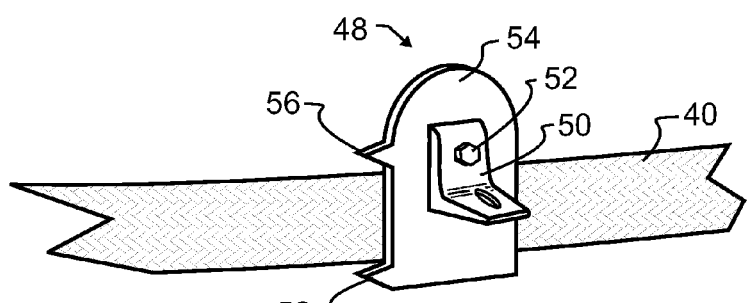
Figure 8C:
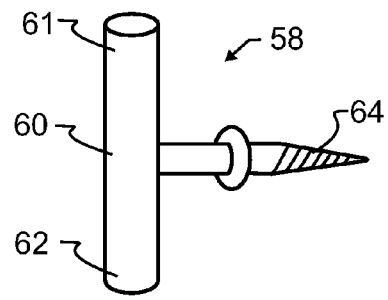

Particularly noteworthy here is the ability for each of the hooks to rotate and thereby align with a non-vertical tree, thereby allowing leveling hunting stand system 15 to hang level. Referring to FIG. 8a, hook 38 is coupled on loop 44 to a first end 40 of a ratchet strap, and opposite thereto to a second end 42 of the ratchet strap. By ensuring that loop 44 is generally circular or at least is primarily defined by smooth and continuous curvature generally free from geometrical discontinuities, then supporting hook 46 may be rotated through a large angle from the generally vertical orientation shown in FIG. 8a towards horizontal. Described like the hand of a clock, supporting hook 46 may pivot between a three o'clock position and a nine o'clock position. This pivoting may occur easily when straps 40, 42 are at low tension, meaning that until straps 40, 42 are tightened to some predictable tension, supporting hook 46 may be rotated. The predictable tension is dependent upon the size, geometry, materials and surface finish chosen for straps 40, 42 and loop 44, and so a user may predictably tighten straps 40, 42 to a point, and then adjust the orientation of hook 38 as desired before finally tensioning straps 40, 42. With some materials, such as those with a smooth surface and finish and where at least one of the components is fabricated from low-friction materials such as polyethylene, it may be possible to rotate hook 38 even when straps 40, 42 are fully tensioned.

Receiver 19 may also rotate about the outer circumference of supporting hook 46, allowing base 2 to rotate about the axis of the termination of supporting hook 46, and to also rotate with supporting hook 46 about an axis extending radially from upstanding member 1 through the approximate center of loop 44. This means there are two axes of rotation inherent in the combination of hook 38 and receiver 19. Similar two axes rotation occurs with the combination of hook 58 and receiver 19, since T-bar 60 will normally rotate about an axis extending radial into a tree by threading into or out from the tree or other upstanding member 1, and either T-bar extension 61 or 62 will pass through receiver 19, allowing receiver 19 to rotate about an axis defined by the longitudinal direction of extensions 61 and 62. In view of the foregoing, it is apparent that similar two-axis rotation occurs between receivers 29, 30, 31 and either hook 38 or hook 58. Hook 48 in combination with receiver 19 and fastener combination 21, 22 can also be designed to obtain this two-axis rotation. The first axis of rotation is obtained by ensuring that fastener combination 21, 22 is not tight, such as by using a Nylok™ nut 22, a pin to ensure nut 22 does not come off, or other suitable technique that enables nut 22 to remain loose, permitting rotation of receiver 19 relative to L-bracket 50 about an axis defined by the longitudinal axis of fastener 21. The second axis of rotation is along the longitudinal axis of bolt 52, which, like fastener 21, is desirably left loose to permit relative rotation between L-bracket 50 and plate 54 about that longitudinal axis. In addition to the two axes of rotation, hook 48 additionally includes one or more anchor teeth 56 extending from plate 54, designed to bite into a tree or other upstanding member 1.

Figure 13:
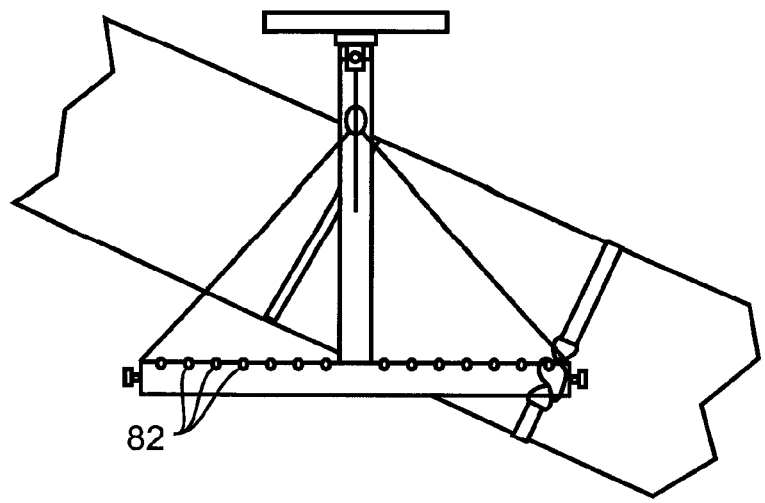
FIG. 13 illustrates an alternative embodiment leveling hunting stand system at an extreme orientation relative to an upstanding support member such as a tree trunk, branch or the like, from a front elevational view.

With base assembly 2 supported by a suitable hook such as hooks 38, 48, 58, the lateral member 5 of T-shaped base assembly 2 is attached to upstanding support 1 by wrapping ratchet straps 70, 72 of ratchet strap 13 about upstanding support 1, and then positioning s-hooks 66, 68 on lateral member 5 of base assembly 2. Next, ratchet strap 13 is tensioned by ratcheting by rotating handle 74 relative to body 76 to shorten one of straps 70, 72, as is well-known in the art of ratchet straps. To prevent s-hooks 66, 68 from slipping on lateral member 5 either before or after tensioning, several alternative anchor facilitating members are considered herein, with an understanding that other suitable apparatus and methods exist that will be apparent after a review of the present disclosure, and that such known alternatives are incorporated herein as well. In a first embodiment as illustrated in FIGS. 1-4, lateral member 5 is notched at intervals. These notches 80 are preferably large enough to receive s-hooks 66, 68 therein, such that when ratchet strap 13 is tensioned sufficiently, s-hooks 66, 68 are securely captured in the notches 80. In an alternative embodiment such as illustrated in FIG. 13, small bumps 82 maybe formed at intervals along lateral member 5, such as by adding material through welding or by other suitable technique.

Figure 14:
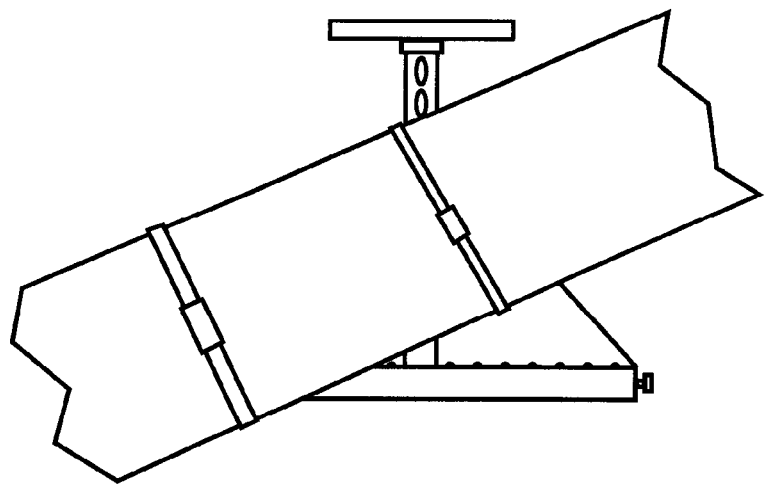
FIG. 14 illustrates the alternative embodiment leveling hunting stand system of FIG. 13 from a rear elevational view.

Upstanding support 1 may touch the back of lateral member 5 at any spot along the backside of lateral member 5, thus allowing lateral member 5 to be positioned relative to upstanding support 1 at any suitable position. By allowing lateral member 5 to be adjustable relative to upstanding support 1, a user may then ensure a plumb and level platform on a tree or limb that is either slanted sideways or fore and aft. This very important ability to reposition is best understood from a comparison of FIG. 1, for exemplary purposes, where ratchet strap 13 is engaged on the left side of lateral member 5, while in FIG. 2, ratchet strap 13 is engaged along the right side of lateral member 5. An even more extreme positioning, owing to a much more slanted and non-vertical upstanding support 1, is illustrated in FIGS. 13 and 14.

A preferred embodiment ratchet strap 13 has at least one cleat 78, with four cleats 78 illustrated, that are designed to bite into the bark of a tree or limb or into a surface of upstanding support 1, to prevent rotation or slipping of ratchet strap 13 about upstanding support 1. This ensures that platform assembly 3 remains firmly and rigidly coupled to upstanding support 1, without any relative motion therebetween.

As already described herein above, a preferred embodiment coupling at the top of base assembly 2 will rotate about two axes. This means that platform assembly 3 may be shifted circumferentially about upstanding support 1 relative to the top coupling. So, as illustrated in FIG. 1, if hook 38 is coupled to receiver 19, then, if desired, ratchet strap 13 and lateral member 5 may be rotated around upstanding support 1. Platform 7, as illustrated in FIG. 1, terminates farthest from the tree to the right in the view. By rotating strap 13 clockwise, for exemplary purposes only and not limiting solely thereto, platform 3 might terminate at the bottom of FIG. 1 without any need to change the position of hook 38. Consequently, and again only for exemplary purpose and not solely limiting thereto, a hunter might change the direction he is facing by only rotating strap 13, without any need to disconnect or rotate hook 38.

Figure 5:
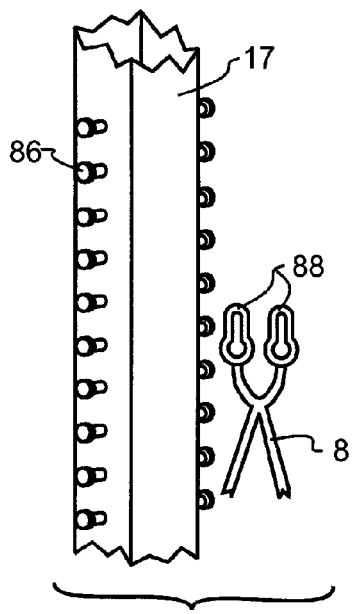
FIG. 5 illustrates a first alternative embodiment T-bar to platform cable coupler by enlarged and sectioned view.
Figure 6:
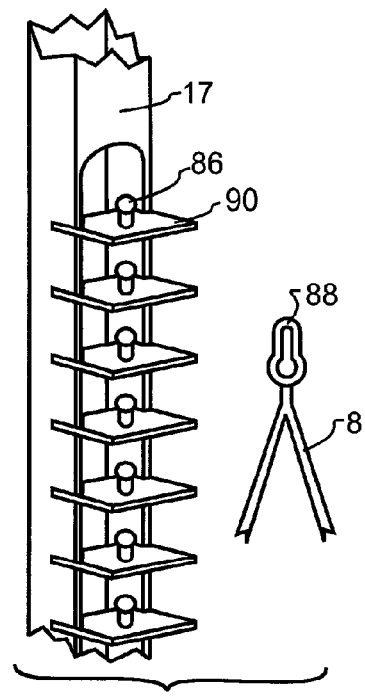
FIG. 6 illustrates a second alternative embodiment T-bar to platform cable coupler by enlarged and sectioned view.
Figure 7:
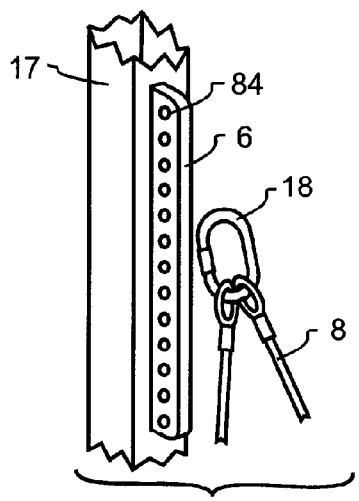
FIG. 7 illustrates the preferred embodiment T-bar to platform cable coupler of FIGS. 1-4 by enlarged and sectioned view.

Once base assembly 2 is secured to upstanding support 1, platform assembly 3 is leveled. As illustrated in FIG. 1, platform assembly 3 is pivotally attached to base assembly 2 through platform mounts 9, which are provided at each end of lateral member 5. Base assembly 2 has a vertical platform leveler 6. This preferred leveler is illustrated by enlarged view in FIG. 7, while FIGS. 5 and 6 illustrate alternative levelers. In the preferred embodiment of FIGS. 1 and 7, any of a variety of known couplers may be used to couple cables 8 to platform leveler 6. In FIG. 1, a spring clip 14 such as is commonly referred to as a carabiner is used, while in FIG. 7 a screw together hook or locking carabiner 18 is illustrated. The carabiner 14 is simply clipped into the hole 84 which is best suited to level platform 7. In the alternative leveler of FIG. 5, which may be used to directly replace leveler 6, a plurality of pins 86 provide coupling points similar to holes 84, and are coupled by a pair of keyhole shaped loops or metal latch hooks 88 that are in turn affixed to cables 8. Alternatively to keyhole shaped loops 88 are simple loops terminating cables 8, and these loops then may wrap preferred pins 86. The benefit of the keyhole loops 88 is a slightly reduced likelihood of accidental release when there is little or no force upon platform 7. In another alternative illustrated in FIG. 6, vertical pin hooks 86 rise from plates 90 integrated into base assembly 2. Platform 7 is then leveled with a single metal latch hook 88 coupled to both cables 8. Regardless of the type of leveler, the carabiner 14, 18, loops or metal latch hooks 88 are attached to cables 8, which in turn connect platform 7 to vertical riser 17 of base assembly 2. Since platform 7 pivots relative thereto, through platform mounts 9, raising or lowering the coupling point to the leveler such as leveler 6 will in turn change the angle between vertical riser 17 and platform 7.

Figure 2:
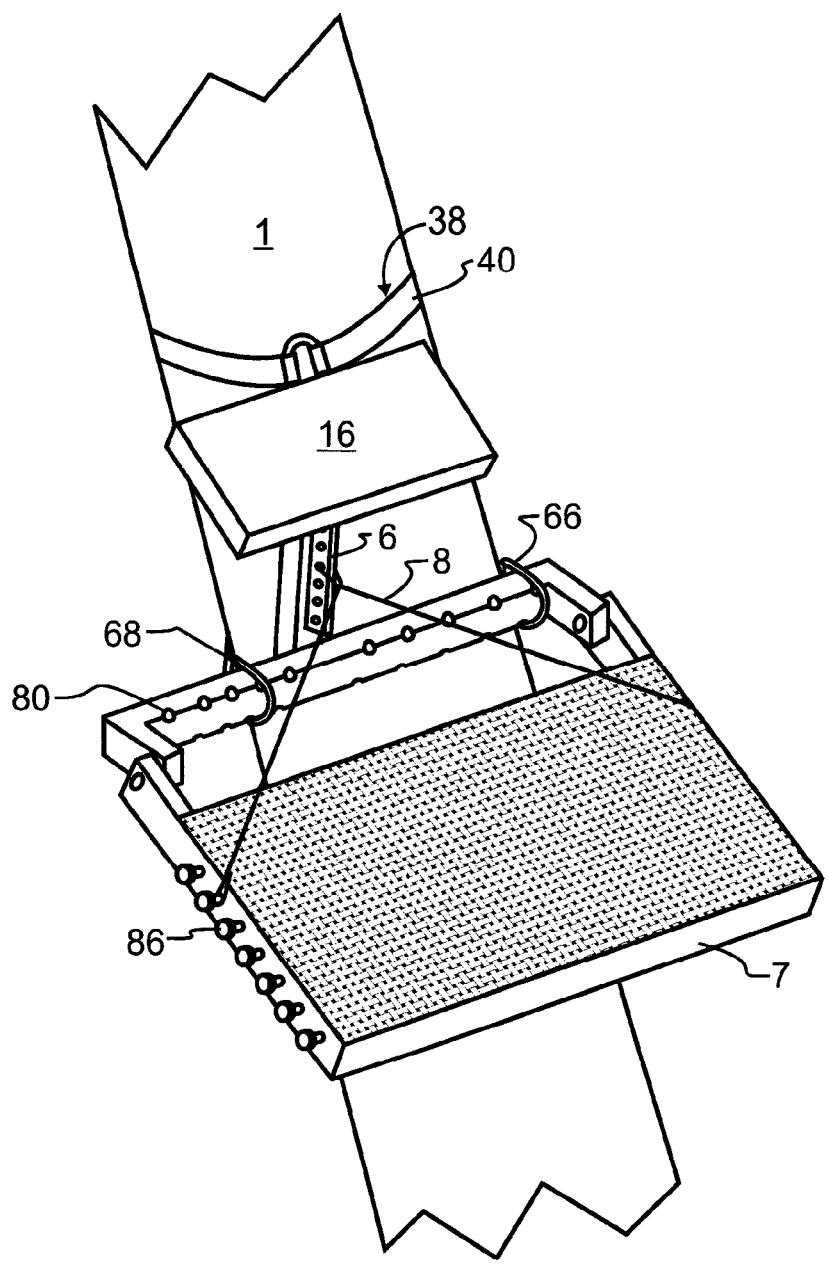
FIG. 2 illustrates a first alternative embodiment leveling hunting stand system fully assembled and similar to the system of FIG. 1 from a projected view.
Figure 3:
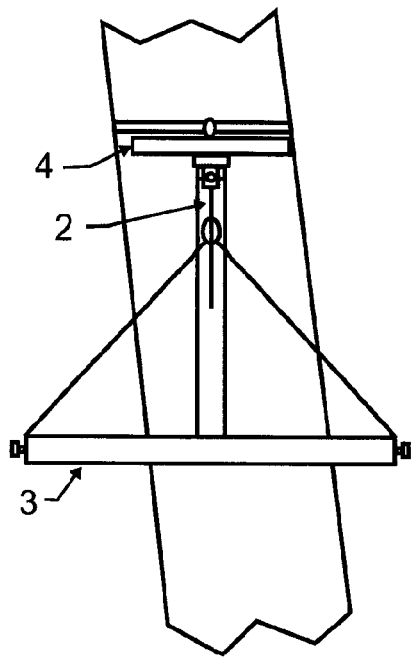
FIG. 3 illustrates the first alternative embodiment leveling hunting stand system of FIG. 2 from a front elevational view.
Figure 4:
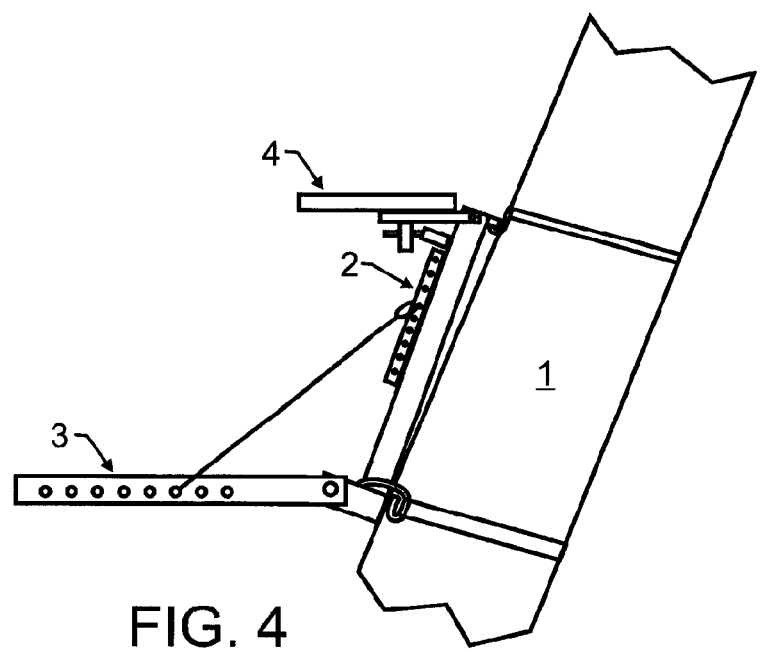
FIG. 4 illustrates the first alternative embodiment leveling hunting stand system of FIG. 2 from a side elevational view.

In an alternative embodiment such as illustrated in FIGS. 2-4, platform assembly 3 could have leveling pins 86 on the sides of platform 7. These leveling pins may be in addition to or instead of levelers such as leveler 6 of FIGS. 1-4. In other words, with cables 8 terminating at a fixed position on the vertical riser member 17 of base assembly 2, the attachment of cables 8 to platform 7 could be changed by moving the cables 8 to desired leveling pins 86, letting platform 7 pivot on platform mounts 9 to the desired level.

A significant feature of the present invention is that platform 7 may be positioned in a plurality of pivotal orientations with respect to base assembly 2, and therefore the orientation of the upstanding support 1 at a slant with respect to plumb does not restrict or prevent platform 7 from being oriented in a level condition.

If upstanding support 1 is not plumb, then seat 16 will also preferably be leveled. This is accomplished by adjusting a bolt 10 mounted on the bottom of swivel seat 16 mount 12a. Bolt 10 may be rotated in one direction to pass towards strike plate 11 and thereby pivot mount 12a in a counterclockwise direction as illustrated in FIG. 1, effectively raising seat 16 away from platform 7, or when rotated in an opposing direction, pass away from strike plate 11 and thereby lower seat 16 towards platform 7. Pivot mount 12a is attached to the upper portion of the vertical riser member 17. In a preferred embodiment, bolt 10 may be stainless steel, and as may be apparent, rotation of bolt 10 one way or the other will allow a hunter to set seat 16 to a desired level. In an alternative embodiment, seat 16, mount 12a, and bolt 10 may be formed integrally as a single seat assembly, which would also be attached to the top portion of the vertical riser member 17, and would otherwise function in a like manner.

The use of a pivotal coupling between vertical riser member 17 and mount 12a permits seat 16 to flip up out of the way of the hunter, without any encumbrance, if so desired.

In the preferred embodiment, bolt 10 rests against base assembly 2 by hitting strike plate 11, and strike plate 11 may be further provided with mounting holes to attach a safety strap 34. Safety strap 34 may be provided to provide added safety in case of a malfunction elsewhere in the mounting system.

Figure 9:
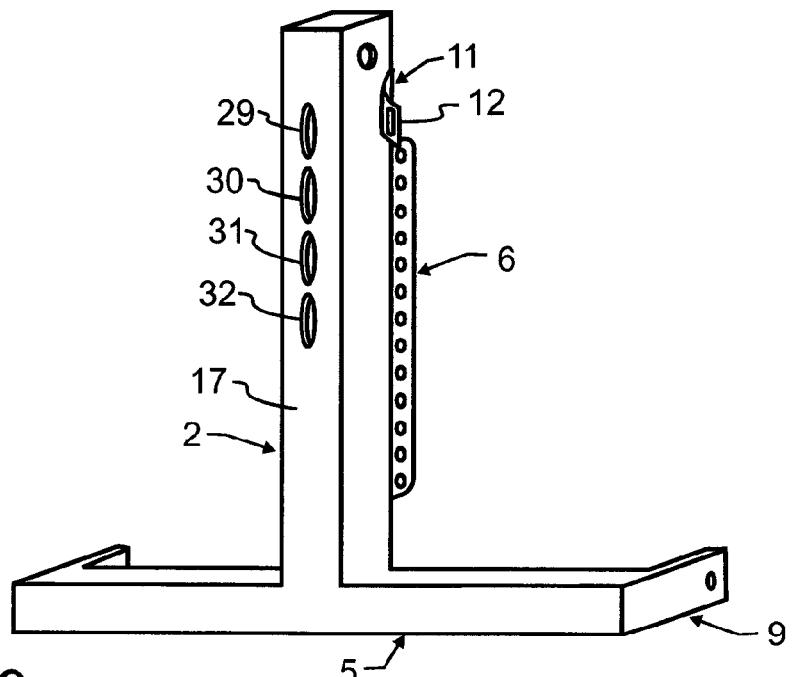
FIG. 9 illustrates a first alternative embodiment T-bar from rear and elevated projected view.
Figure 10:
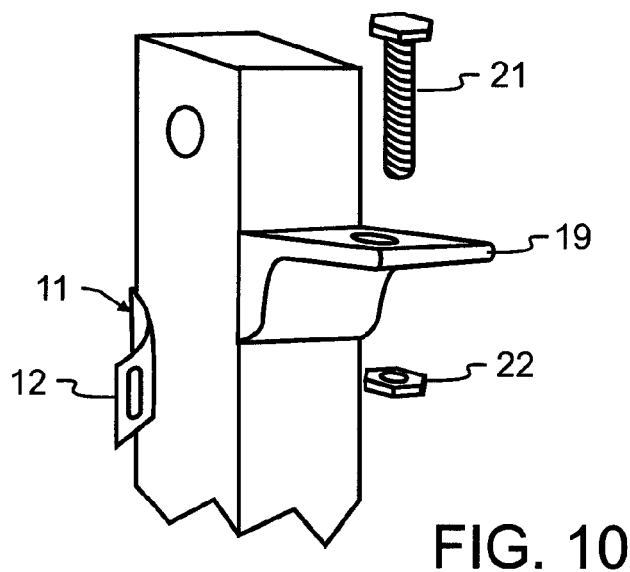
FIG. 10 illustrates the top of a second alternative T-bar from rear and elevated projected view.

FIG. 9 illustrates base assembly 2 from the back side, which would be operatively facing upstanding support 1 when arranged such as illustrated in FIG. 1. This view shows the relationship of the plurality of receivers 29-32. The number of receivers such as 29-32 is not critical to the present invention. However, the provision of more than two receivers permits a hook such as hook 38 to couple at a variety of locations along vertical riser member 17. This capability is important when upstanding support 1 deviates significantly from plumb, such as is illustrated for exemplary purposes in FIGS. 13 and 14. As shown therein, when the angle between vertical riser member 17 and upstanding support 1 increases, the distance between lateral member 5 and the preferred coupling point into vertical riser member 17 decreases. As a result, when upstanding support 1 and vertical riser member 17 near parallel, such as illustrated in FIG. 1, hook 38 might preferably couple into receivers 29,30. However, when the angle between upstanding support 1 and vertical riser member 17 is large, then hook 38 might instead couple into receivers 31, 32. Consequently, the provision of a plurality of receivers such as 29-32 permits a smaller leveling hunting stand system 15 to be used than with only a pair of receivers.

Figure 17:
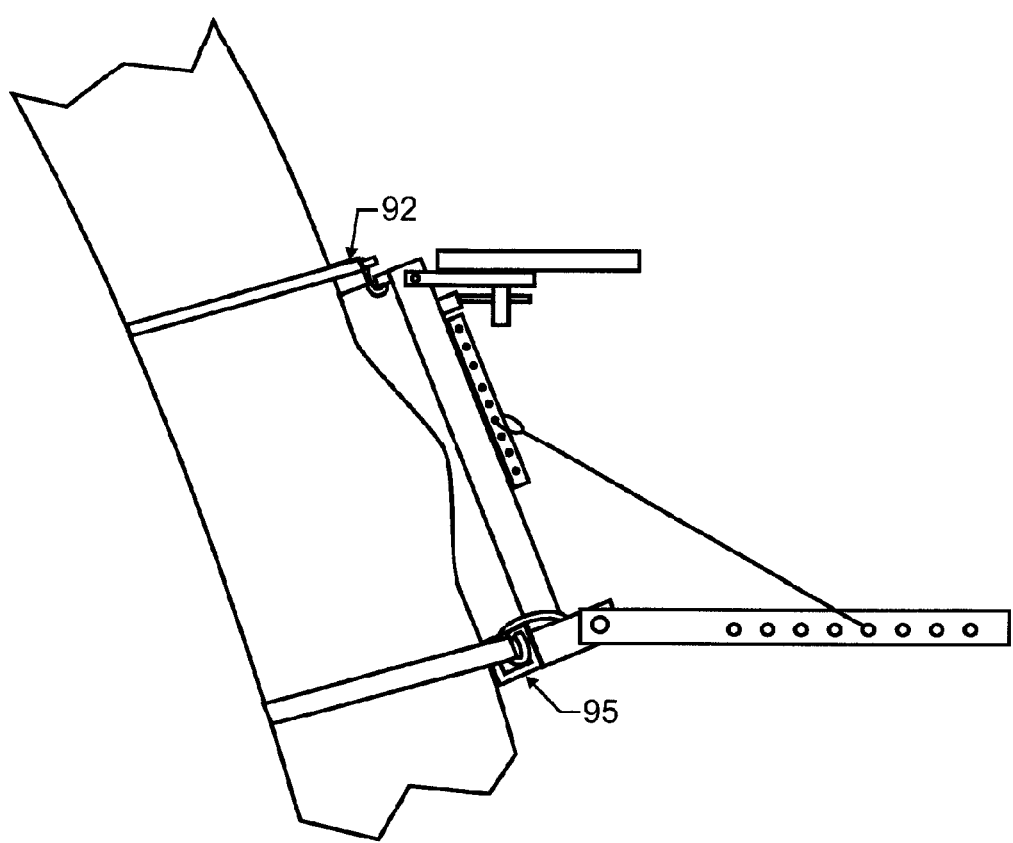
FIG. 17 illustrates a leveling hunting stand system incorporating the spacers of FIGS. 15 and 16 from a side elevational view.

In spite of the many features that allow the preferred and alternative embodiments to be adapted to a variety of upstanding supports 1, there may still arise situations where there are surface irregularities that would cause base member 2 to wobble or be less securely coupled. One such situation is illustrated in FIG. 17, where a bulge in upstanding support 1 of sufficient size may cause vertical riser member 17 to rock upon the bulge. To reduce or prevent such rocking, one or both of top spacer 92 and bottom spacer 95 may then be used.

Figure 15:
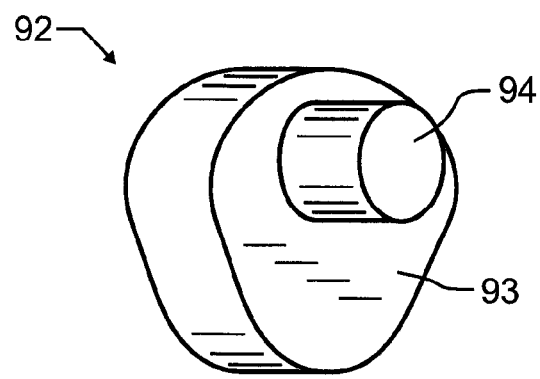
FIG. 15 illustrates a preferred embodiment upper spacer from a projected view.

As illustrated in FIG. 15, top spacer 92 is designed to work optimally with hook 38, by providing a protrusion 94 which will pass through the center of loop 44 and define the axis of rotation of loop 44, while loop 44 otherwise presses against spacer body member 93 and is retained away from upstanding support 1 thereby.

Figure 16:
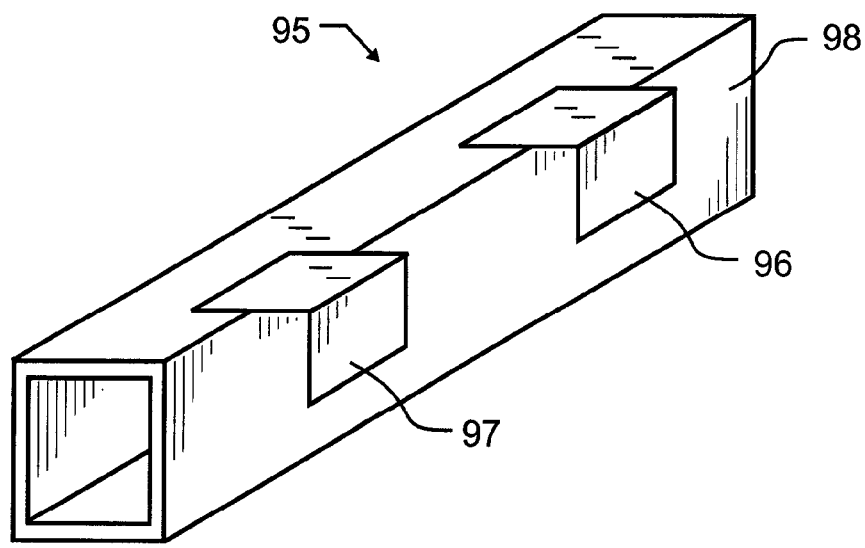
FIG. 16 illustrates a preferred embodiment lower spacer from a projected view.

As illustrated in FIG. 16, bottom spacer 95 may be fabricated from a square tubular body member 98 having two attachment tabs 96, 97 that couple to lateral member 5. Body member 98 will then space lateral member 5 from upstanding support 1.

Figure 11:
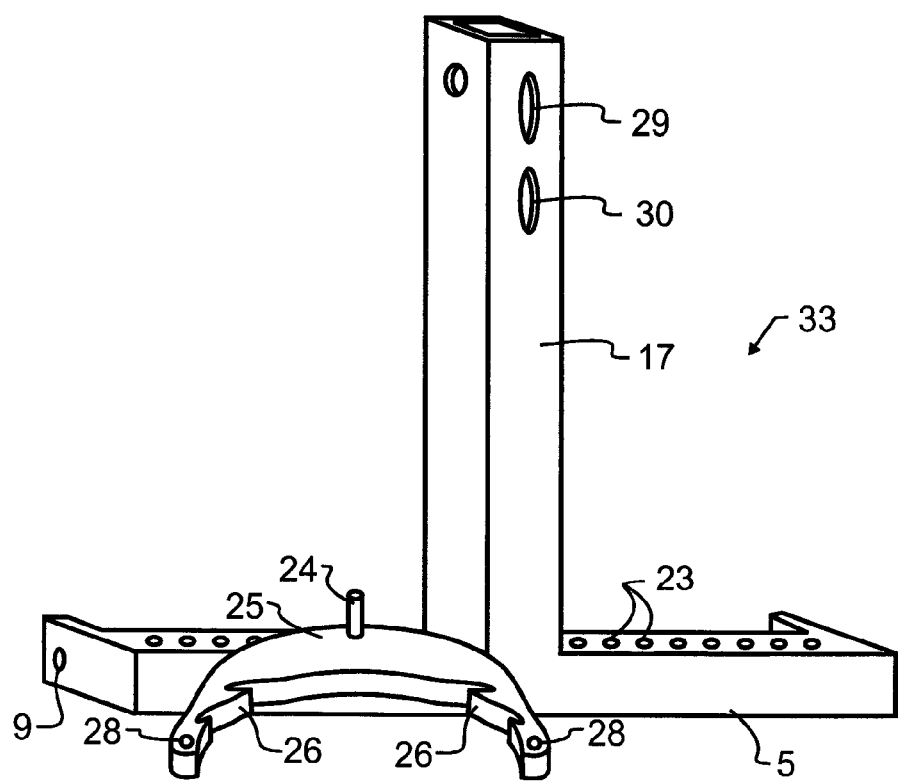
FIG. 11 illustrates a second alternative embodiment T-bar from rear and slightly elevated projected view.
Figure 12:
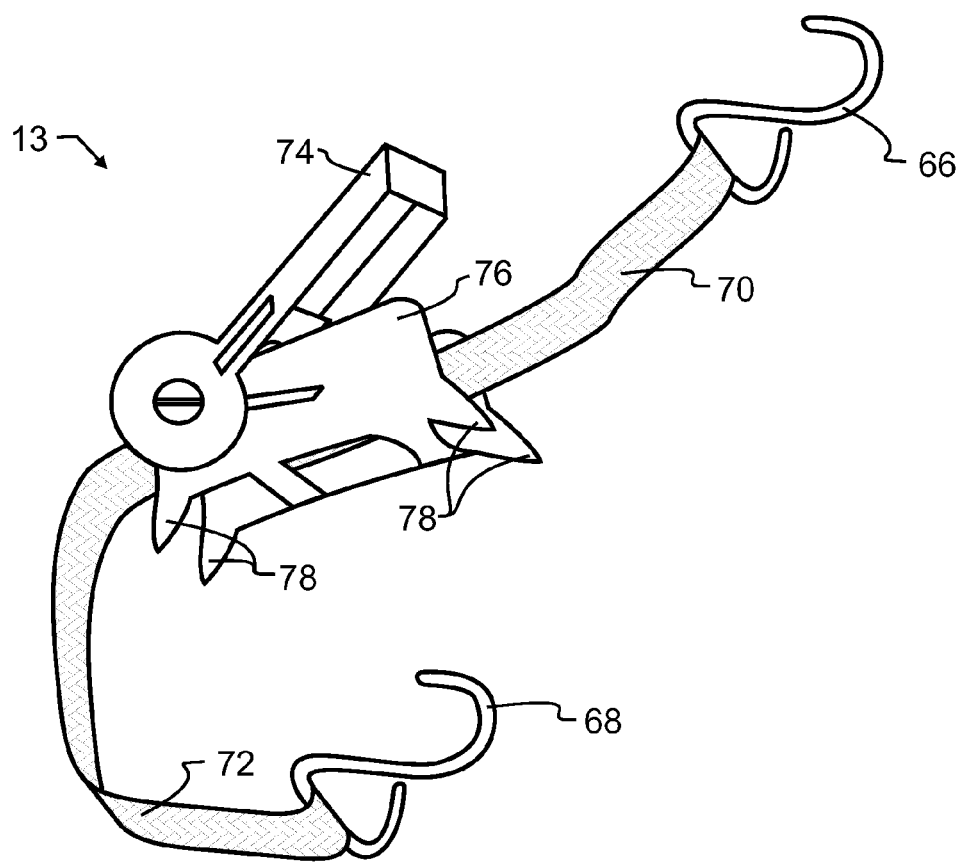
FIG. 12 illustrates a preferred embodiment ratchet that provides improved gripping stability when attached to a tree or similar structure, from a projected view.

FIG. 11 illustrates an alternative embodiment base member 33, which is designed to preferably be a direct replacement for base member 2. While a leveler is not visible, owing to the direction of view of FIG. 11, it will be understood that any of the levelers described herein or known equivalents thereto may be used in association with base member 33. In this alternative embodiment, a plurality of adjusting holes 23 are provided along the top surface of lateral member 5. Into one of these holes an adjusting pin 24 will be inserted. Pin 24 may be separate from or integral with a tree engaging shoe 25 that preferably includes one or more points 26 that are designed to slightly penetrate the surface of an upstanding support 1 and thereby rigidly and securely engage therewith. A pair of holes 28 are provided to which fasteners such as strap hooks 66, 68 will couple, so that a suitable fastener such as ratchet strap 13 can be used to forcefully secure shoe 25 against upstanding support 1. The selection of which adjusting hole 23 that adjusting pin 24 passes through determines the angle of vertical riser member 17 relative to upstanding support 1, and there is no chance of slippage changing this angle, short of shearing pin 24 or other material failure.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A leveling hunting stand system configured to operatively mount on an upstanding member and configured to support a person at an elevated position with respect to a ground surface, the leveling hunting stand system comprising:
    a base assembly having a receiver defining an opening, a support member configured for operatively positioning adjacent to said upstanding member and said support member having an upper end and a lower end, and a lateral member mounted to said lower end of said support member, said lateral member extending laterally outward from said support member and having a plurality of anchor facilitating members;
    a mounting configured to operatively circumscribe said upstanding member and adapted to be rotated about an axis parallel to a longitudinal axis of the upstanding member;
    a platform assembly having a platform configured to operatively support said person at said elevated position, said platform pivotally mounted to said base assembly; and
    a platform support structure configured to support said platform in a plurality of positions with respect to said base assembly such that the platform is configured to be operatively supported in a level orientation relatively independent of an orientation of said upstanding member;
    wherein said base assembly comprises a securing strap structure configured to operatively secure said base assembly to said upstanding member, said securing strap structure comprising:
    a pair of securing straps each having opposite ends;
    a ratchet assembly configured to adjustably wrap a first one of said pair of securing straps within a ratchet body, said ratchet assembly configured to permit adjustment of a length of said first one of said pair of securing straps between said opposite ends of said first one of said pair of securing straps;
    at least one cleat rigidly affixed to said ratchet body and configured to operatively penetrate a surface of said upstanding member; and
    a pair of hooks, a first one of said pair of hooks mounted to a first one of said opposite ends of said first one of said pair of securing straps and removably secured to a first one of said plurality of anchor facilitating members, a second one of said pair of hooks mounted to a second one of said opposite ends of a second one of said pair of securing straps and removably secured to a second one of said plurality of anchor facilitating members.

2. The leveling hunting stand system of claim 1, further comprising a seat structure pivotally mounted to said support member and freely rotatable away from said platform assembly.

3. The leveling hunting stand system of claim 1 wherein said base assembly further comprises a leveler having a plurality of leveling attachment points, said platform support structure attached to said base assembly by a flaccid member coupled to at least one of said plurality of leveling attachment points.

4. The leveling hunting stand system of claim 3 wherein said leveler is further comprised by a plate extending longitudinally generally parallel with said base assembly support member and extending in a width transversely to said base assembly support member, and said plurality of leveling attachment points further comprise a plurality of leveling attachment holes passing through a thickness of said plate.

5. The leveling hunting stand system of claim 3 wherein said leveling attachment points further comprise a plurality of pins protruding from said base assembly support member, any one of said plurality of pins can be used for coupling to said flaccid member and thereby selectively fixing a position of the plurality of positions of said platform with respect to said support member.

6. The leveling hunting stand system of claim 1 further comprising a securing strap adapted to be operatively tensioned about said upstanding member and spaced from said mounting distally along said base assembly.

7. The leveling hunting stand system of claim 6, wherein said base assembly has a generally planar surface configured to be operatively adjacent to said upstanding member.

8. The leveling hunting stand system of claim 7, further comprising at least one spacer configured to be operatively removably inserted between said upstanding member and said base assembly, wherein said spacer is adapted to be operatively capable of accommodating surface protrusions in said upstanding member.

9. The leveling hunting stand system of claim 1, wherein said anchor facilitating members comprise a plurality of s-hook receiving notches in said lateral member.

10. The leveling hunting stand system of claim 1, wherein said anchor facilitating members comprise a plurality of s-hook retaining protrusions protruding from said lateral member.

11. The leveling hunting stand system of claim 1, wherein said anchor facilitating members comprise a plurality of holes in an upper surface of said lateral member, an upstanding member engaging shoe having a pin protruding longitudinally generally downward from said shoe and passing into one of said plurality of holes, said upstanding member engaging shoe pivotal about a longitudinal axis of said pin, and at least one upstanding member penetrating point extending from said shoe in a generally horizontal direction.

12. The leveling hunting stand system of claim 1, wherein said base assembly support member further comprises at least three holes and said mounting further comprises an s-hook selectively positionable within any two adjacent ones of said at least three base assembly support member holes.

13. An elevated leveling hunting stand system configured to operatively mount on an upstanding member and configured to operatively support a person at an elevated position with respect to a ground surface, said elevated leveling hunting stand system comprising:
  a base assembly having a plurality of platform leveling attachment holes;
  a mounting configured to operatively couple said base assembly to said upstanding member, said mounting having
    a loop,
    a flaccid strap having a first terminus and a second terminus coupled to distal sides of said loop respectively and adapted to operatively circumscribe said upstanding member;
    said flaccid strap and said loop adapted to be rotated about an axis parallel to a longitudinal axis of the upstanding member, and
    a J-hook unitary with and extending radially from said loop, said loop rotatable relative to said first terminus and said second terminus about an axis passing centrally through said loop and thereby adapted to operatively change an orientation of said J-hook relative to said flaccid strap and said upstanding member and thereby operatively permit said J-hook to be oriented vertically generally independently of an orientation of said upstanding member, said J-hook passing through a base assembly receiver opening and thereby being adapted to operatively couple said base assembly to said upstanding member;
  a platform assembly having a platform configured to operatively support said person at said elevated position, said platform pivotally mounted to said base assembly; and
  a platform support structure attached to said base assembly and having a carabiner and a flaccid member, said flaccid member coupled on a first end to said platform assembly and on a second end to said carabiner which is operatively clipped into one of said plurality of platform leveling attachment holes, said platform support structure operatively capable of supporting said platform in a plurality of positions with respect to said base assembly such that the platform is supportable in a level orientation relatively independent of an orientation of said upstanding member.

14. The elevated leveling hunting stand system of claim 13 wherein said base assembly is further comprised by a riser member and a plate extending longitudinally generally parallel with said riser member and extending in a width transversely to said riser, and having said plurality of leveling attachment holes passing through a thickness of said plate.

15. The elevated leveling hunting stand system of claim 13 wherein said leveling attachment holes are formed between a support member of the base assembly and a distal end of a plurality of pins protruding from said base assembly support member, and one of said plurality of pins can be used for coupling to said flaccid member and thereby selectively fixing a position of the plurality of positions of said platform with respect to said base assembly.

16. The elevated leveling hunting stand system of claim 13 wherein said loop and said J-hook are configured in combination to couple said base assembly to said upstanding member through at least two axes of rotation.

17. The elevated leveling hunting stand system of claim 13 wherein said base assembly comprises a support member configured to operatively position adjacent to said upstanding member and said upstanding member having an upper end and a lower end, and a lateral member mounted to said lower end of said support member, said lateral member extending laterally outward from said support member and having a plurality of anchor facilitating members.

18. The elevated leveling hunting stand system of claim 17 wherein said base assembly comprises a strap structure configured to operatively secure said base assembly to said upstanding member, said strap structure comprising:
  a pair of securing straps each having opposite ends;
  a ratchet configured to adjustably wrap a first securing strap of said pair of securing straps within a ratchet body, said ratchet configured to permit adjustment of a length of said first securing strap between said opposite ends of said first securing strap;
  at least one cleat rigidly affixed to said ratchet body and configured to operatively penetrate a surface of said upstanding member; and
  a pair of hooks, a first one of said pair of hooks mounted to a first one of said opposite ends of said first securing strap and removably secured to a first one of said plurality of anchor facilitating members, a second one of said pair of hooks mounted to a second one of said opposite ends of a second securing strap of said pair of securing straps and removably secured to a second one of said plurality of anchor facilitating members.

19. An elevated leveling hunting stand system adapted to be operatively mounted on an upstanding member and capable of operatively supporting a person at an elevated position with respect to a ground surface, said elevated leveling hunting stand system comprising:
  a base assembly having
    a leveler having a plurality of platform leveling attachment holes,
    a support member adapted for operative positioning adjacent to said upstanding member and having an upper end and lower end, and a lateral member mounted to said lower end of said support member, said lateral member extending laterally outward from said support member and having a plurality of anchor facilitating members, and a strap structure adapted for operatively securing said base assembly to said upstanding member, said strap structure having
   a pair of securing straps each having opposite ends,
   a ratchet adjustably wrapping a first securing strap of said pair of securing straps within a ratchet body, said ratchet permitting adjustment of a length of said first securing strap of said pair of securing straps between said first securing strap opposite ends;
at least one cleat protruding from said ratchet body and adapted to operatively penetrate a surface of said upstanding member; and
a pair of hooks, a first one of said pair of hooks mounted to a first one of said opposite ends of said first securing strap and removably secured to a first one of said plurality of anchor facilitating members, a second one of said pair of hooks mounted to a second one of said opposite ends of a second securing strap of said pair of securing straps and removably secured to a second one of said plurality of anchor facilitating members;
a mounting adapted to operatively couple said base assembly to said upstanding member;
a platform assembly having a platform capable of operatively supporting a person, said platform pivotally mounted to said base assembly; and
a platform support structure attached to said base assembly and having a carabiner and a flaccid member, said flaccid member coupled on a first end to said platform assembly and on a second end to said carabiner which is operatively clipped into one of said platform leveling attachment holes, said platform support structure operatively capable of supporting said platform in a plurality of positions with respect to said base assembly such that the platform is supportable in a level orientation relatively independent of an orientation of said upstanding member.

\* \* \* \* \*